US005091713A

United States Patent [19]

Horne et al.

[11] Patent Number: 5,091,713

[45] Date of Patent: Feb. 25, 1992

[54] INVENTORY, CASH, SECURITY, AND MAINTENANCE CONTROL APPARATUS AND METHOD FOR A PLURALITY OF REMOTE VENDING MACHINES

[75] Inventors: Arthur H. Horne; Ralph J. Henderson, both of Salt Lake City; David C. Anderson, Deer Valley, all of Utah

[73] Assignee: Universal Automated Systems, Inc., Salt Lake City, Utah

[21] Appl. No.: 521,605

[22] Filed: May 10, 1990

[51] Int. Cl.$^5$ .......................... G08B 13/00; G06F 7/08

[52] U.S. Cl. .................................... 340/541; 340/568; 340/665; 340/825.33; 340/825.35; 364/479; 235/381

[58] Field of Search ................................ 340/665-666, 340/541, 568, 538-539, 679, 683, 521, 825.33-825.35; 364/479, 568; 379/91; 177/45, 25.12; 221/2, 6; 194/216-217; 453/17, 58; 235/381

[56] References Cited

U.S. PATENT DOCUMENTS

Re. 32,115 4/1986 Lockwood et al. ................ 235/381

3,896,266 7/1975 Waterbury ........................ 379/91 X 4,080,598 3/1978 Cardone .............................. 340/683

4,216,461 8/1980 Werth et al. .................... 364/479 X 4,369,442 1/1983 Werth et al. .................. 340/825.35

4,412,292 10/1983 Sedam et al. ........................ 364/479

4,818,854 4/1989 Davies et al. ........................ 235/381

4,954,697 9/1990 Kokubun et al. .................. 235/381

*Primary Examiner*—Jin E. Ng

*Assistant Examiner*—Thomas J. Mullen, Jr.

*Attorney, Agent, or Firm*—J. Winslow Young

[57] ABSTRACT

A monitoring system for monitoring a vending machine at a remote location, the monitoring system including an inventory sensing system for providing a continuous update of the inventory in the vending machine, an alarm system to signal when the vending machine is being damaged or the systems in the vending machine are in need of attention, a communication system, and a credit card verification system. The vending machine is coupled to a central computer system which monitors all the systems in the vending machine. The communication system includes a credit card verification system, a two-way communication capability, a display screen, and a printer.

15 Claims, 3 Drawing Sheets

INVENTORY, CASH, SECURITY, AND MAINTENANCE CONTROL APPARATUS AND METHOD FOR A PLURALITY OF REMOTE VENDING MACHINES

BACKGROUND

1. Field of the Invention

This invention relates to vending machines and, more particularly, to an inventory and security apparatus and method for a plurality of remotely located vending machines.

2. The Prior Art

The term "vending machine" was first used in about 1909 to define a coin-operated machine for vending merchandise. Any suitable merchandise can be sold through a vending machine including foodstuffs such as snacks, soft drinks, and frozen novelties, etc., and non-edible items such as cigarettes, postage stamps, newspapers, and the like. The basic concept of the vending machine is that it contains an inventory of the particular merchandise and dispenses individual units of merchandise in response to product ordered along with the money deposited in the machine. A primary advantage to the vending machine is that it provides for the sale of merchandise in remote locations at all hours without requiring the presence of a sales person.

Customarily, each vending machine is visited on a periodic, routine basis by a service person who conducts an inventory of the product sold, replenishes the stock, checks the machine for any malfunctions, and retrieves the deposited money. Since each machine in each location will have a different vending history, some machines could be empty for considerable periods of time while others will be utilized only sporadically. Further, a malfunctioning vending machine creates a loss of goodwill, a loss of revenue, and increases the risk of vandalism to the machine by an angry customer. Ideally, the service frequency for each machine will occur just prior to the machine having vended all of its stock, regardless of the frequency of need.

A further expense that adversely affects the profitability of a vending machine service company is the excessive inventory requirements for the service person. In the absence of reliable information about the resupply needs of a particular vending machine, the service person must carry a full inventory of all merchandise sold through the vending machine so as to assure that no lost sales occur because of depletion of inventory between sales calls. However, the total excess inventory requirements for certain items such as food items can result in certain food items being held in inventory beyond the expiration date. Further, excessive handling of packaged merchandise along with the heat and vibration encountered in a delivery vehicle substantially reduces the expected shelf life of certain products.

System failure of certain types of vending machines such as those with refrigeration or freezer units is particularly crucial. For example, a vending machine for frozen novelty items can create several hundred dollars in damage if a failed freezer unit is not discovered for several days. The damage results not only from the loss of stock but also resultant damage from melted product inside the machine and to the surrounding flooring such as carpeting. The hidden costs from loss of goodwill from such an unforeseen accident can also be considerable.

The advantage created by the ability to place a vending machine in a remote, unattended location is also a major contributor to one of the primary causes of damage to the machine and that is either through vandalism or damage caused by unauthorized removal of money from the machine. Since a vending machine costs thousands of dollars, this type of damage can be considerable not only to the machine but also from the loss of inventory and money.

In view of the foregoing, it would be an advancement in the art to provide an inventory and security apparatus and method for monitoring a plurality of remotely located vending machines. It would also be an advancement in the art to provide a vending machine with a communication system coupled to a central location to enable a user of the vending machine to report a malfunction condition in the vending machine. Such a novel apparatus and method is disclosed and claimed herein.

BRIEF SUMMARY AND OBJECTS OF THE INVENTION

This invention is directed toward an apparatus and method for controlling and securing a plurality of vending machines located remotely from the central control. A telephone line interconnects each vending machine to a centrally located computer. Sensors in each vending machine detect the number and types of items dispensed, the amount of money collected, the quantity and type of change dispensed, problem conditions such as loss of electrical power, refrigeration malfunction, temperatures out of tolerance, vandalism, and the like. A communication link is also provided to enable a user to report a malfunction and for the security personnel in the central location to broadcast a message from the vending machine. The vending machine also has the ability to accept credit card charges and print receipts and even a menu for the user.

It is, therefore, a primary object of this invention to provide improvements in inventory and security apparatus for vending machines.

It is another object of this invention to provide improvements in the method of determining inventory of a vending machine at a remote location.

Another object of this invention is to provide a method for communication between a central location and a plurality of vending machines each of which is located at a discrete, remote location.

Another object of this invention is to provide each vending machine with a plurality of discrete sensors to sense items dispensed, money received, change dispensed, temperature, acts of vandalism, and the like.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
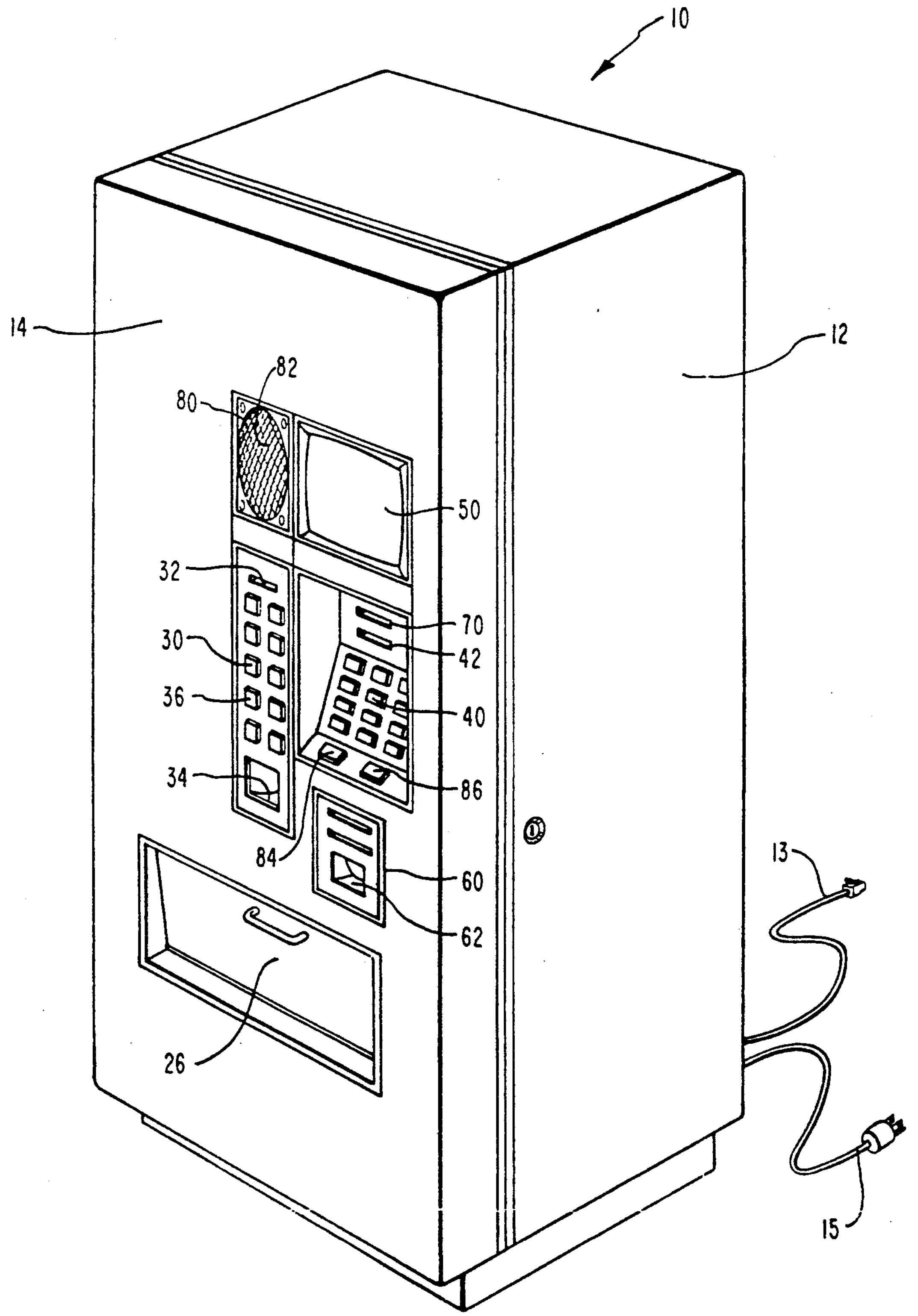
FIG. 1 is a perspective view of the first preferred embodiment of a vending machine incorporating the novel features of this invention.

The invention is best understood by reference to the drawing wherein like parts are designated by like numerals throughout in conjunction with the following description.

GENERAL DISCUSSION

The vending machine control apparatus and method of this invention is designed to accomplish a number of specific functions in addition to inventory control. These include credit card verification and receipt printing, security, and maintenance, including scheduled maintenance. Inventory control is an important aspect of this system since it provides to the service person a current listing of the products requiring replenishment while at the same time it provides an overview of the total vending system to identify those products having the best and worst sales histories at each location. With this information, the flow of products to the various vending machines can be very accurately controlled for increased profitability.

Reduced inventory is a goal most companies seek because it directly affects the profitability of the company. Further, if a delivery person is required to carry only the necessary resupply items and then only when required, numerous advantages result. For example, a smaller delivery vehicle is required to carry the specific resupply items, the resupply route can be accurately planned so as to service only those vending machines requiring service, and the delivery person will need to carry from the delivery vehicle to the vending machine only those items required to restock the vending machine.

Credit card use is increasing particularly for the purchase of items for which the cost substantially exceeds one dollar. While bill changers are common additions to most of the newer models of vending machines, they do not lend themselves well for accommodating the purchase of items costing several dollars. Also, bill changers reject worn or torn bills, and many people are accustomed to purchasing merchandise through the use of a credit card. Not only is a credit card safer to carry but it also provides the user with a printed history of purchases.

Clearly, the technology exists for the adaptation of a conventional credit card reader to a vending machine. Importantly, since each vending machine of this invention is coupled to a telephone line, it is a simple matter to process the credit card purchase automatically with this system. The processing step includes verifying the current status of the credit card and making the necessary electronic fund transfers to complete the sale.

A small, conventional printer is included in the vending machine to provide the customer with a printed copy of the transaction along with any other printed information such as menus, menu histories, ingredient listings, nutritional information, discount coupons, promotional items, and the like. Advantageously, the printer can be programmed to print most of the foregoing information even if the credit card system is not utilized.

Each vending machine is directly coupled by the telephone line to a central security monitor which is programmed to alert security personnel if sensors in the vending machine detect attacks or other apparently unlawful intrusions on the vending machine. For example, a sharp, forceful blow to the vending machine will be sensed as vandalism while an attempt to pry open the locking mechanism will also be sensed and an alert signal passed to the security personnel.

Each vending machine is also equipped with a speaker/microphone combination in addition to a call button which enables the customer to communicate directly with the central security personnel. The speaker system also enables the security personnel to issue verbal warnings to persons in the vicinity of a vending machine undergoing a vandalism attack thereby helping dissuade the perpetrator from further damage to the vending machine. The two-way communication system also allows for prompt response to customer complaints, etc., and also provides for directing any required refunds directly to the address provided by the customer. Another advantage to the speaker system is that it can be programmed to verbally thank the customer or even provide verbal directions to the customer in the event of difficulty.

DETAILED DESCRIPTION

Figure 2:
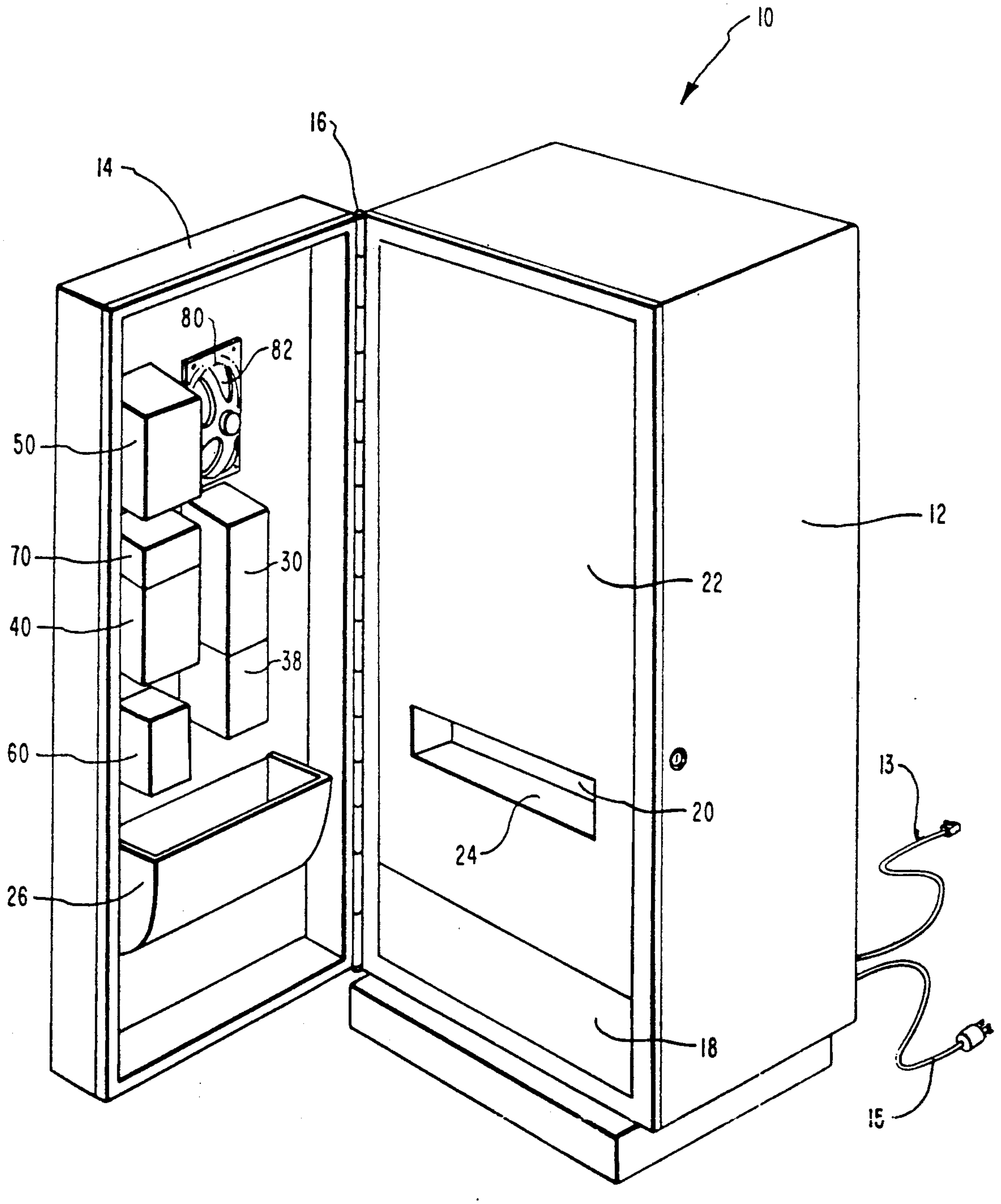
FIG. 2 is a perspective view of the vending machine of FIG. 1 shown with the front open to reveal the internal components.

Referring now to FIGS. 1 and 2, a conventional vending machine is shown generally at 10 and includes a housing 12 and a front panel 14 hingedly joined to housing 12 by a hinge 16. Vending machine 10 can be any suitable vending machine for vending products such as frozen novelties, soft drinks, prepared meals, or the like. In the event vending machine 10 is used for refrigerated or frozen products it includes the appropriate refrigeration mechanism in a machine compartment 18 and a cold temperature chamber 20 behind an insulated, inner door 22. An outlet 24 delivers product (not shown) from cold temperature chamber 20 to a dispenser chute 26 in front panel 14.

An electrical power cord 15 supplies electrical energy to the various electrical systems in vending machine 15 from a conventional wall outlet (not shown). A telephone cord 13 provides the necessary communication link between vending machine 10 and the various control/communication systems described more fully hereinafter with respect to FIG. 3. Importantly, telephone cord 13 is provided as a conventional, armored telephone cord such as found on the handset to a pay telephone (not shown). This latter feature is important since it is through telephone cord 13 that the necessary protection and inventory control features of vending machine 10 are controlled.

Front panel 14 provides the support surface and enclosure for a selector 30, a credit card reader 40, a display screen 50, a bill changer 60 and a printer 70. Selector 30 includes a coin slot 32 and a change slot 34 with a plurality of adjacent selection buttons 36, all of which are conventional features of a coin-operated vending machine. The only difference is the inclusion of a coin box sensor 38 (FIG. 3) the function of which will be discussed more fully hereinafter.

Credit card reader 40 is essentially a conventional credit card reader and includes an insertion slot 42 and a keyboard 44 for entering the correct confirmatory code for the credit card (not shown) inserted into insertion slot 42. Screen 50 provides written instructions to the customer (not shown) in a manner somewhat analogous to the screen of an automatic teller machine. Coupled with credit card reader 40 and screen 50 is a printer 70 which not only prints a receipt for purchases with the credit card but also can be used to print coupons, promotional information, and the like.

Bill changer 60 is a conventional bill changer which is programmed to verify the authenticity of a the specific paper money (not shown) and then to allow the customer to select the desired product through selection buttons 36. Any change to be returned is discharged into coin return slot 62. Bill changer 60 is directly linked to an alarm system 66 (FIG. 3), the function of which shall be discussed more fully hereinafter.

A speaker 80 includes an integral microphone 82 and can be activated by depressing a call button 84 adjacent credit card reader 40. Speaker 80 can be activated independently by security and/or maintenance personnel as will be discussed more fully hereinafter. Speaker 80 provides for the delivery of background music, if desired, messages, advertisements, or audible instructions for the use of the various components of vending machine 10. Importantly, speaker 80 in combination with microphone 82 serves as a communication link for the customer. Speaker 80 can also be used to deliver warning messages to persons tampering with or otherwise attempting an unlawful activity with vending machine 10.

It should be noted that each of selector 30, credit card reader 40, display screen 50, bill changer 60, printer 70, and speaker 80 are shown as separate units for ease of illustration. Clearly, the technology currently exists whereby each of these units can be incorporated into the same housing which would be substantially smaller than the combined space taken up by each of these units as shown This latter feature is important in that it means that a conventional vending machine can be retrofit with the novel system of this invention.

Figure 3:
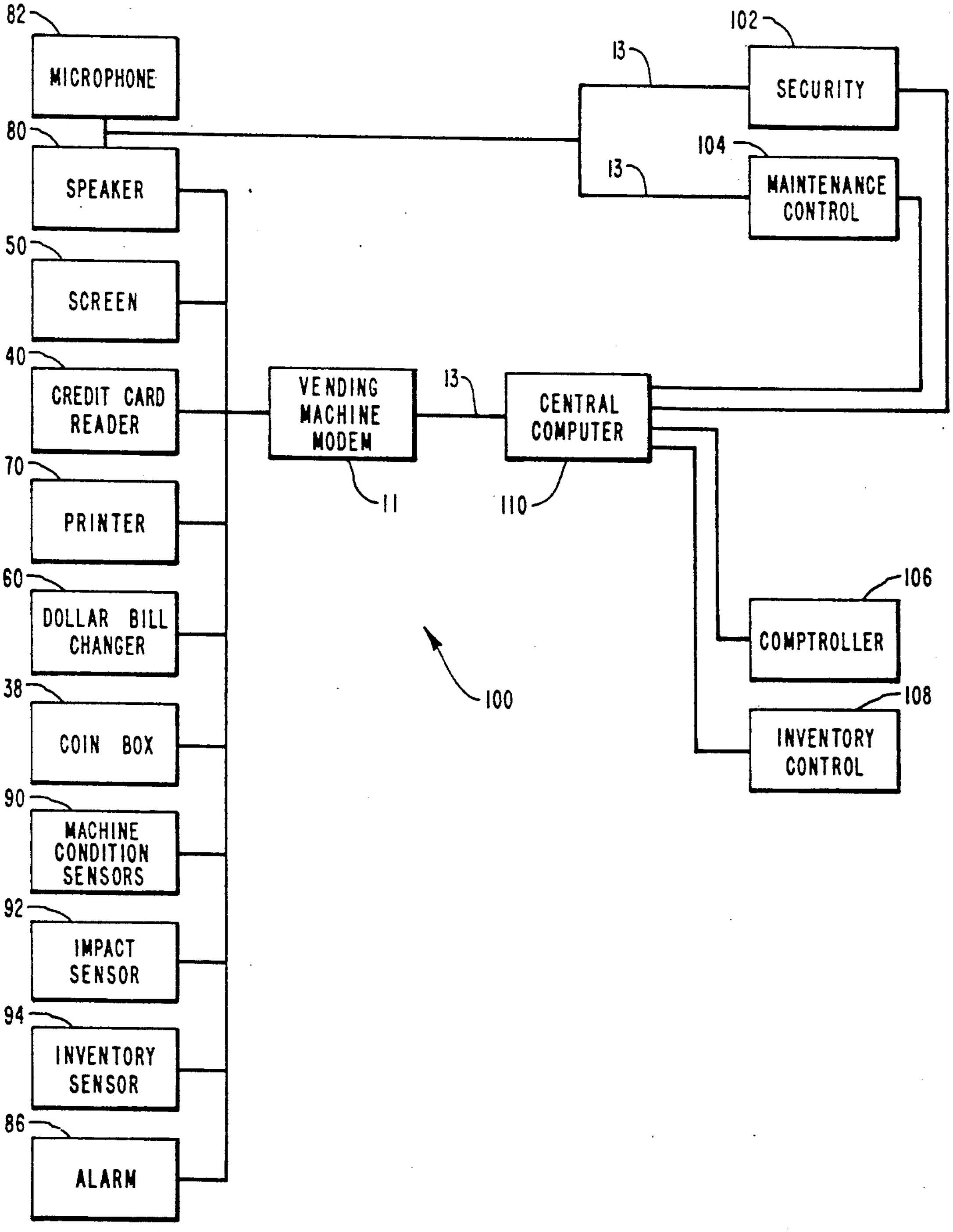
FIG. 3 is a schematic diagram of the inventory and security features of this invention.

Referring now also to FIG. 3, the schematic for the novel security and inventory apparatus and method of this invention is shown generally at 100 and includes a security station 102, a maintenance control station 104, a comptroller station 106, and an inventory control station 108 interconnected by a central computer 110 to vending machine modem 11. Central computer 110 is specifically configured to be coupled with a plurality of vending machines 10 although only one is shown for ease of illustration. Telephone line 13 provides the communication link between vending machine modem 11 and central computer 110 and also provides the direct link of speaker 80 and microphone 82 with security station 102 and maintenance control station 104. As illustrated, telephone line 13 is shown separately for ease of presenting the foregoing concept of direct linkage although it is the same telephone line.

During normal operation, vending machine modem 11 acts as the relay device for transmitting transactional information between the various systems in vending machine 10 and the central computer. For example, referring also to FIGS. 1 and 2, a customer (not shown) will place the appropriate paper money into dollar bill changer 60 or a credit card into credit card reader 40 prior to making a selection with selector 30. Change, if any, is delivered through a change slot 34 and the item of merchandise is delivered to dispenser chute 26. Simultaneously, inventory sensor 94 electronically records the transaction and stores the accumulated inventory information for subsequent transmittal to inventory control 108. The monies received are likewise recorded electronically by dollar bill changer 60 and coin box 38 and transmitted via vending machine modem 11 and central computer 110 to comptroller 106.

A customer using credit card reader 40 inserts an appropriate credit card along with the personal encoding information. Central computer 110 verifies the authenticity of the credit card and the authorization code thereby activating vending machine 10 to deliver the merchandise selected at selector 30. Simultaneously, a receipt is printed by printer 70 while controller 106 records the transaction and inventory control 108 records the merchandise sold and deducts the same from the inventory record of vending machine 10.

At all times a visual message can be displayed on screen 50 not only to impart operating instructions to the consumer but also to carry merchandise advertising as well as paid advertising for products or services remote from the merchandise sold through vending machine 10. Speaker 80 can also be used in conjunction with screen 50 to transmit the foregoing or supportive information verbally.

Security for vending machine 10 is supplied by several features among which are impact sensor 92 and alarm 86. Impact sensor 92 is designed to sense untoward motion such as sharp blows, tilting, or the like. Even an unauthorized attempt to move vending machine 10 will result in impact sensor sending an alarm signal via alarm 86 and vending machine modem 11 to central computer 110. The resulting alarm signal is then sent to security 102 where the appropriate response is initiated. One response will be for security 102 to alert the local police, building security, or even the building maintenance personnel in the building where vending machine 10 is located. Simultaneously or separately, as the case may be, security 102 can activate either or both of microphone 82 and speaker 80. Through microphone 82 security 102 can listen to the ambient sounds around vending machine 10 and thereby possibly obtain sufficient information to enable security 102 to initiate the appropriate action. One such action would be to broadcast the appropriate verbal message through speaker 80. In most instances such a verbal message should be sufficient to deter further attacks on vending machine 10. If such deterrence is ineffective, the appropriate law enforcement or security personnel can be alerted to the problem giving the precise location of vending machine 10.

Alarm 86 is also coupled to bill changer 60 and coin box 38 as well as door 14 so as to initiate alarm signals in the event there is an unlawful attempt to break into vending machine 10. This is particularly important since vending machine 10 may contain considerable amounts of cash and is generally placed at a remote location. As before, alarm 86 transmits the alarm signal via vending machine modem 11 to central computer 110 where the alarm signal is forwarded to security 102. Any of the above-described responses can be initiated by security 102. Advantageously, once it is learned that the unlawful entry to vending machine 10 results in a high capture rate of persons engaged in such unlawful activities, there should be a significant drop in the number of such incidents perpetrated against vending machine 10 in the future.

Machine condition sensors 90 are configured to detect selected machine conditions such as temperatures outside the temperature ranges specified, refrigeration system failure, or failure of any other selected system in vending machine 10. Depending upon the seriousness of the particular system failure, alarm 86 will either store the specific information electronically or, in the most probable circumstance, transmit this information directly to central computer 110 via vending machine modem 11. Central computer 110 routes the information to maintenance control for action. Maintenance control can then initiate the appropriate response which can range between placing the information on the instruction printout for the route service person for routine action or initiate an immediate service response.

Machine condition sensors 90 are also programmable to act as a process control system if vending machine 10 is used to vend a consumable item such as a frozen entree (not shown), or the like, and the item requires a second or third step prior to delivery of the item to the purchaser. For example, if vending machine 10 is used for vending hot meat pies (not shown) stored in the frozen state in cold temperature chamber 20, the programmable features of machine condition sensors 90 enable it to retrieve the frozen meat pie and transfer it to a microwave oven (not shown) where the meat pie is defrosted and heated to the proper temperature for that particular meat pie. Thereafter, the hot, meat pie is delivered to dispenser chute 26.

Inventory sensor 94 is configured to be interrogated periodically by central computer 110 via vending machine modem 11 to update inventory control 108 with the current status of the merchandise inventory in vending machine 10. Advantageously, this information can be obtained over telephone line 13 during periods of low telephone rate charges, and, since the information is transmitted electronically, the actual line time is relatively brief thereby providing significant savings.

Perhaps the greatest cost savings realized through vending machine 10 are from the improved inventory control achieved through inventory control 108. In particular, the service person (not shown) is provided with a precise route for servicing vending machines 10 at each specific location. The servicing instructions will specify the types and quantities of the specific merchandise to be put into each machine along with the amount of change to be placed in the coin changer portion of selector 30. Additionally, the routing instructions will carry any repair and maintenance instructions for vending machine 10. Importantly, the service person (not shown) is thereby able to more efficiently service more vending machines 10 more quickly with unnecessary trips with excess inventor virtually eliminated. One specific advantage is that the service person knows in advance what is required for a visit to a specific vending machine. This means that only the necessary restocking merchandise need be carried from the delivery vehicle to vending machine 10. Also, if any tools, cleaning supplies, or the like are required, the route instructions contain such information so that the time saved by the service person is significant.

Another advantage to inventory control 108 is that it can readily supply a continuous flow of sales information about merchandise dispensed through vending machine 10. This is important since it allows the operator (not shown) to maximize sales of merchandise through vending machine 10 by concentrating high-demand merchandise into vending machines 10 where the most units of that specific merchandise is being sold. Correspondingly, slow moving merchandise can also be identified and even eliminated entirely from the system. This latter feature is particularly advantageous in light of the fact that very little excess inventory is held in storage and none is carried on the delivery vehicles so that it is relatively inexpensive to discontinue a particular line of merchandise.

Significantly, the introduction of a new product can be test marketed relatively inexpensively through vending machine 10. In particular, the new product can be advertised over speaker 80 and screen 50 while sales of the same can be accurately monitored not only by the physical location of vending machine 10 but also by continuous monitoring by inventory sensor 94 in combination with central computer 110 to provide a running inventory of sales by time of day. Additionally, printer 70 can be used to print rebate slips, coupons, and the like as a further means of identifying consumers and their response to the particular merchandise being dispensed by vending machine 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A monitor system for a remote vending machine comprising:

an electronic monitor means operable to receive signals from a remote vending machine;

communication means for transmitting electronic signals between said electronic monitor means and said remote vending machine, said communication means including a speaker mounted on said vending machine to permit audible messages to be communicated from said electronic monitor means to a customer in the vicinity of said vending machine and a call switch and a microphone to enable said customer to communicate verbally and directly with a person at a location remote from said vending machine, said communication system comprising an alarm means for signaling said electronic monitor means when an alarm condition is experienced by said vending machine, said microphone being independently operable to enable security personnel to listen to ambient sounds adjacent said vending machine during said alarm; and inventory sensing means in said vending machine for sensing the inventory of said vending machine and transmitting electronic signals to said electronic monitor means as a function of said inventory.

2. The monitor system defined in claim 1 wherein said communication means includes verification and acceptance means for credit cards to thereby verify the validity of a credit card and then accept the credit card as a means of payment for a product purchased from said vending machine.

3. The monitor system defined in claim 1 wherein said alarm means comprises a first alarm sensor means for sensing a system malfunction in said vending machine.

4. The monitor system defined in claim 1 wherein said alarm means comprises a second alarm sensor means for sensing excessive force imparted to said vending machine, said excessive force being interpreted by said electronic monitor means as either vandalism to said vending machine or an attempted unlawful entry of said vending machine.

5. The monitor system defined in claim 1 wherein said electronic monitor means includes an inventory control means for providing a service order for said vending machine as a function of said electronic signals received from said inventory sensing means.

6. The monitor system defined in claim 1 wherein said inventory sensing means comprises continuous inventory sensing means for providing continuous information about the inventory in said vending machine.

7. The monitor system defined in claim 1 wherein said communication means includes a machine condition sensor means for sensing the condition of said vending machine and transmitting said electronic signals representative of said vending machine condition to said electronic monitor means.

8. The monitor defined in claim 1 wherein said communication means comprises a display screen on said vending machine for displaying a visual message on said vending machine.

9. A monitor system for a remote vending machine comprising:

sensor means in said vending machine for selectively sensing and generating electronic information about machine conditions, inventory status, and alarm conditions;

transmitting means for transmitting to a central location said electronic information from said sensing means;

communication means for allowing a first person at said central location to communicate with a second person at said vending machine, said communication means including microphone means and speaker means for allowing said second person to speak directly with said first person at said central location;

inventory control means for monitoring said inventory status to provide an inventory record for said vending machine; and alarm means for transmitting an alarm when an alarm condition is sensed in said vending machine.

10. The monitor system defined in claim 9 wherein said communication means includes credit card verification means for verifying the authenticity of a credit card.

11. The monitor system defined in claim 10 wherein said communication means includes a printer means for printing information to be taken by a customer of said vending machine.

12. The monitor system defined in claim 10 wherein said communication means includes a display screen means for visually displaying information.

13. A method for monitoring a vending machine at a remote location comprising:

providing said vending machine with an alarm means for sensing an alarm condition in said vending machine;

mounting an inventory sensing means in said vending machine for sensing the inventory condition of said vending machine;

incorporating a communication means in said vending machine, said communication means comprising a speaker, a microphone, a display screen, and a printer;

placing a money receiving means in said vending machine, said money receiving means comprising a credit card verification means for verifying the authenticity of a credit card, a coin changer and a bill changer;

coupling said vending machine to a central computer means with a telephone line, said central computer means monitoring said alarm means, said inventory sensing means, and said money receiving means; and protecting said vending machine by directly coupling said vending machine through said alarm means to a security means thereby providing security to said vending machine, said protecting step including selectively operating said microphone independently to enable security personnel to listen to ambient sounds with said microphone during said alarm condition.

14. The method defined in claim 13 wherein said coupling step includes monitoring said central computer means for obtaining information about the current inventory status of said vending machine.

15. The method defined in claim 13 wherein said method includes monitoring machine conditions in said vending machine including delivery of products purchased from said vending machine.

* * * * *